(12) United States Patent
Pelletier et al.

(10) Patent No.: US 8,314,799 B2
(45) Date of Patent: Nov. 20, 2012

(54) ENHANCED MOTION BEHAVIOR FRAMEWORK

(75) Inventors: Jean-Francois Pelletier, Los Angeles, CA (US); Gregory Niles, Culver City, CA (US); Stephen Sheeler, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 11/735,200

(22) Filed: Apr. 13, 2007

(65) Prior Publication Data
US 2008/0252646 A1   Oct. 16, 2008

(51) Int. Cl.
*G06T 13/00* (2011.01)
(52) U.S. Cl. .................................. 345/474; 345/473
(58) Field of Classification Search .................. None
See application file for complete search history.

(56) References Cited

U.S. PATENT DOCUMENTS

| 5,877,777 | A  | * | 3/1999  | Colwell ........................ 345/473 |
| 5,995,107 | A  | * | 11/1999 | Berteig et al. ................ 345/420 |
| 6,069,634 | A  | * | 5/2000  | Gibson ......................... 345/424 |
| 6,448,971 | B1 | * | 9/2002  | Seefeldt et al. ............... 345/475 |
| 6,577,315 | B1 | * | 6/2003  | Kroitor ......................... 345/473 |
| 7,111,239 | B2 | * | 9/2006  | Morris-Yates ................ 715/709 |
| 7,180,523 | B1 | * | 2/2007  | Macri et al. .................... 345/582 |
| 7,589,742 | B2 | * | 9/2009  | Street et al. .................... 345/585 |
| 2004/0056871 | A1 | * | 3/2004 | Milliron ........................ 345/647 |
| 2004/0227760 | A1 | * | 11/2004 | Anderson et al. ............. 345/473 |
| 2006/0274070 | A1 | * | 12/2006 | Herman et al. ................ 345/474 |
| 2007/0216701 | A1 | * | 9/2007 | Bruderlin et al. ............. 345/581 |

* cited by examiner

*Primary Examiner* — Daniel Hajnik
(74) *Attorney, Agent, or Firm* — Kenyon & Kenyon LLP

(57) ABSTRACT

An enhanced motion behavior framework, in which an input is received from a user corresponding to an object to be animated and one or more animation parameters to be applied to the object, the one or more animation parameters are applied to the object, and an animation of the object is displayed based on the application of the one or more parameters to the object.

35 Claims, 17 Drawing Sheets

ENHANCED MOTION BEHAVIOR FRAMEWORK

FIELD

The present disclosure generally relates to computer animation, and at least one particular implementation relates to an enhanced motion behavior framework for animating objects.

BACKGROUND

Computer animation is the art of creating moving images using a computer, and is a sub-field of both computer graphics and animation. To create the illusion of movement, an image is displayed on the computer screen then quickly replaced by a new image that is similar to the previous image, but shifted slightly. Animating shapes and objects is a tedious process.

SUMMARY

According to one general implementation, an input is received from a user corresponding to an object to be animated and one or more animation parameters to be applied to the object, and the one or more animation parameters is applied to the object. An animation of the object is displayed based on the application of the one or more animation parameters to the object.

Implementations may include one or more of the following features. For example, one or more of the animation parameters may define a randomization animation behavior, or may include an amount parameter, a multiplier parameter, an apply to parameter, a frequency parameter, a noisiness parameter, or a preserve angle parameter. One or more of the animation parameters may define a wriggle animation behavior, or may include an amount parameter, a multiplier parameter, an apply to parameter, a frequency parameter, a wriggle offset parameter, a noisiness parameter, a link parameter, or a preserve angle parameter. One or more of the animation parameters may define an oscillation animation behavior, or may include a wave shape parameter, a phase parameter, an amplitude parameter, a speed parameter, or an alternate phase parameter.

In a further example, applying the one or more animation parameters may further include constraining movement of the object using a pinning point, or moving the object around a center point. One or more animation parameters may be applied about a moving axis. The animation of the object may be displayed in real-time or near-real time to receiving the input. The object may be defined by control points.

In other examples, one or more of the animation parameters may animate the object by cycling the control points between two different values, creating a sine wave shape, a square wave shape, a sawtooth wave shape, or a triangle wave shape between the control points. One or more of the animation parameters may adjusts a phase, amplitude, or speed of the cycling of the control points, may offset a phase of a first control point from a phase of an adjacent second control point by 180°, or adjust the cycling of a first control point to be aligned based on a point or perpendicular to a line. One or more of the animation parameters may animate the object by applying a random offset to the control points, or may define a maximum value to offset the control points, where the offset may be an additive offset, a substractive offset, or an additive and substractive offset.

Additionally, one or more of the animation parameters may define an amount of random variation per unit time, an additional random variance to the defined amount of random variation per unit time, or a proportionality of the random offset. The object may be defined by tangent handles, and one or more of the animation parameters may animate the object by applying a random offset to the tangent handles. One or more of the animation parameters may define the flatness of the tangent angles.

According to another general implementation, an animation authoring environment includes a graphical user interface to facilitate communication with a user, and menu options within the graphical user interface to enable the user to select one or more animation parameters to be applied to a specified object. The animation authoring environment may also include one or more application processes to apply the selected one or more animation parameters to the specified object and to display a resulting animation of the object.

According to a further general implementation, a computer program product is tangibly embodied in a machine readable medium. The computer program product includes instructions that, when read by a machine, operate to cause a data processing apparatus to receive an input from a user corresponding to an object to be animated and one or more animation parameters to be applied to the object, apply the one or more animation parameters to the object, and display an animation of the object based on the application of the one or more animation parameters to the object.

The details of one or more implementations are set forth in the accompanying drawings and the description, below. Other potential features and advantages of the disclosure will be apparent from the description and drawings, and from the claims.

DESCRIPTION OF DRAWINGS

FIGS. 4A-4I depict an exemplary oscillation animation behavior.

Like reference symbols in the various drawings indicate like elements throughout.

DETAILED DESCRIPTION

In generating motion graphics for broadcast and video, a motion graphics or animation creator, such as a user of a motion graphic application, generates animated graphics to create the illusion of an object movement, or of an object transforming appearance. Using the motion graphic application, the user defines objects and introduces animation effects to modeled vector-based objects (or "shapes"). The vector-based objects may include control points for determining mathematical curves of the object, where a shape is defined by connecting the control points together using various interpolation techniques. By moving and editing the control points, the user can edit or animate the shape.

A shape may be animated by adjusting animation behavior parameters associated with the shape. In particular, shape animation behaviors, such as an oscillation animation behavior, a randomize animation behavior, or wriggle animation behavior, can be applied to shapes to cause an oscillating, randomizing or wriggling of the positions of control points of a shape, respectively. The shape animation behaviors can be adjusted using a set of parameters, to change the overall look, effect or magnitude of the behavior. For example, an oscillation animation behavior can be adjusted by parameters such as, an oscillation speed, an amplitude of oscillation, and a phase.

Figure 1:
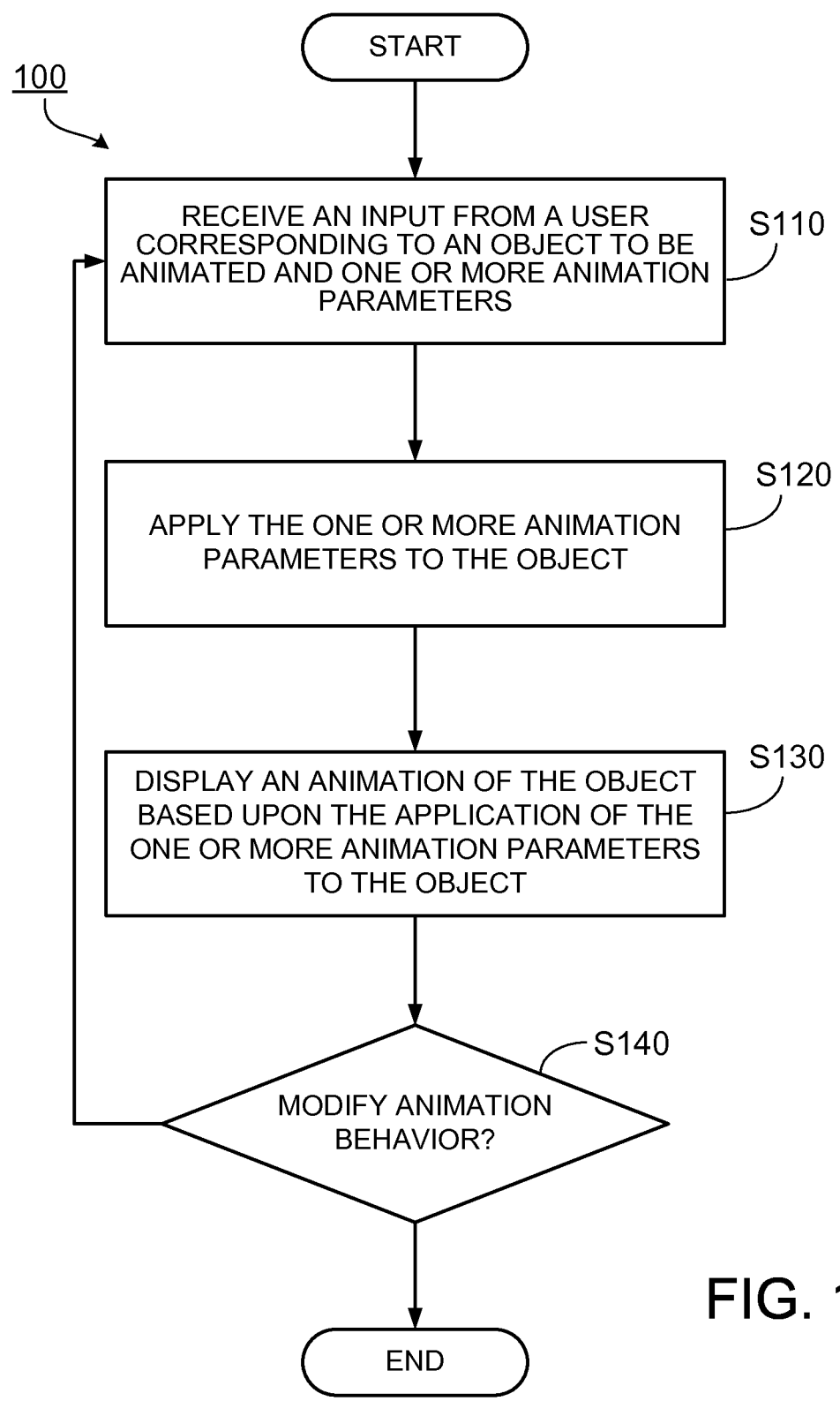
FIG. 1 is a flowchart illustrating an exemplary process for animating an object, according to one general implementation.

FIG. 1 is a flowchart depicting an exemplary process 100 for applying shape animation behaviors to the shape, such as by adjusting the properties of the control points of the shape, where the exemplary process 100 may be implemented by a motion graphic application. Briefly, the process 100 includes receiving an input from a user corresponding to an object to be animated and one or more animation parameters to be applied to the object, applying the one or more animation parameters to the object, and displaying an animation of the object based on the application of the one or more animation parameters to the object.

In more detail, when the process 100 begins, input is received from a user corresponding to an object to be animated and one or more animation parameters to be applied to the object (S110), such as when motion graphic application receives input from a user to select one or more shapes to be animated via a graphical user interface ("GUI").

Using a GUI, the user can select a shape to be animated using an input device such as a mouse. Furthermore, the motion graphic application may display menus or controls within the GUI to enable the user to select one or more animation parameters to the specified shape. The motion graphic application can include a menu or control that allows a user to select an oscillation speed, an amplitude of oscillation, or a phase to be applied to the selected shape.

The one or more animation parameters are applied to the object (S120). The motion graphic application can determine, based on input parameters, new positions of the control points of the shapes in a next animation frame, and use the new positions to redraw the shape in the next frame. In one implementation, when the shape animation behavior is applied to a shape, all of the control points are affected by the animation behavior. The user may reset affected control points, delete or add control points by using an on-screen control, or may sweep select the shape to again select all points.

An animation of the object is displayed based upon the application of the one or more animation to the object (S130). The animation may redraw the shape in a next frame, via the GUI. Redrawing the shape in the next frame may include, for example, determining the appropriate position of the control points based upon the applied shape animation behavior, then connecting the control points via an established interpolation technique.

If the animation behavior is to be modified (S140), an additional input is received from the user corresponding to an object to be animated and one or more animation parameters (S110). If no modification to the animation behavior is required (S140), the process 100 ends. A determination of whether the animation behavior is to be modified may be an automatic determination, for example, and may occur, for example, when a parameters is adjusted or whether another shape is selected for applying animation parameters on the motion graphic application.

Figure 2A:
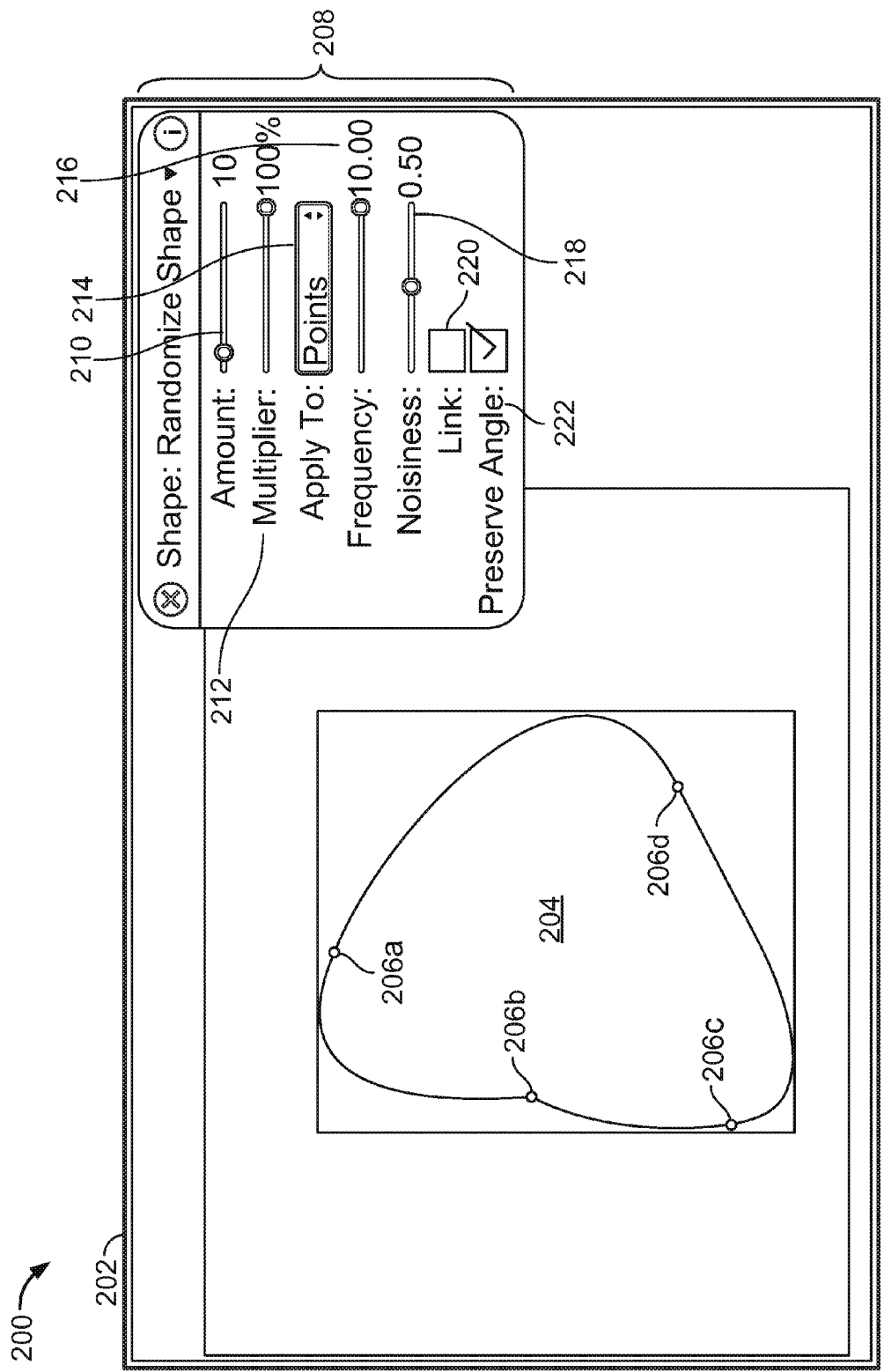
FIGS. 2A-2C depict an exemplary randomize animation behavior
Figure 2B:
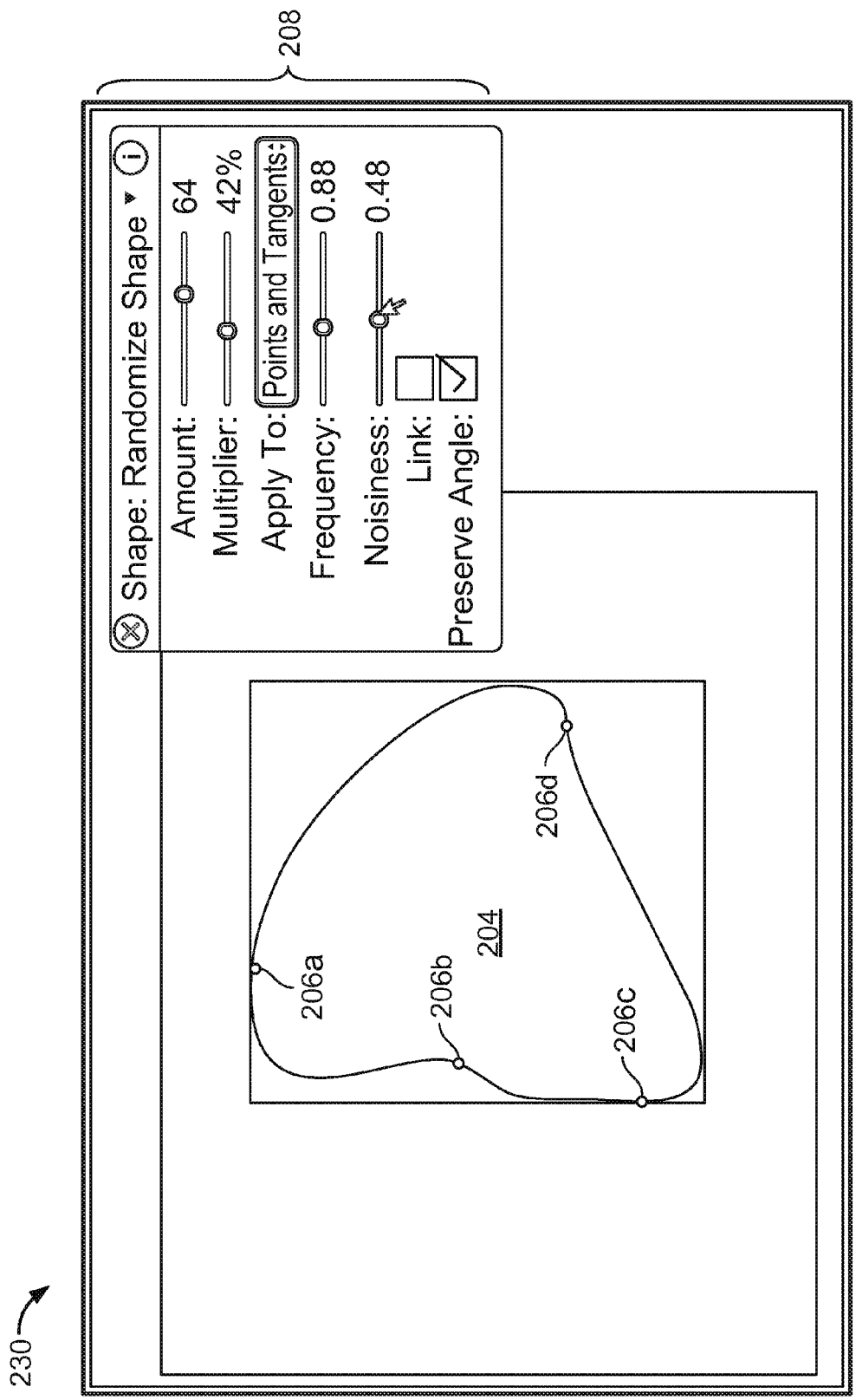
Figure 2C:
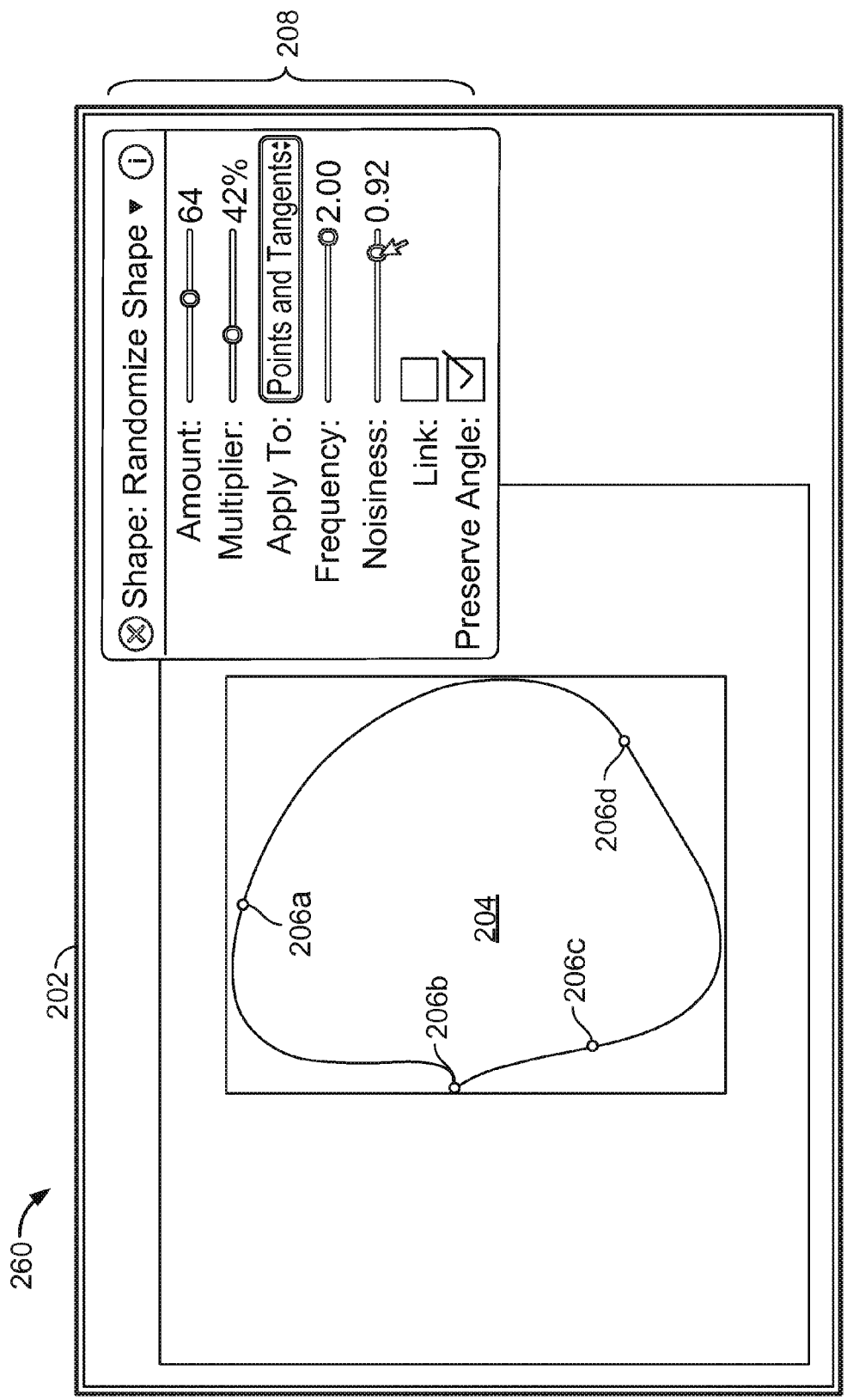

FIGS. 2A-2C illustrate an exemplary randomize animation behavior applied to a shape 204, in time-sequenced states 200, 230, 260 of the randomization, respectively. The randomize animation behavior allows a user to animate the control points of a shape by applying a random offset to each point of the shape. This animation behavior is useful for creating rapid and varied effects on the shape A user can use a GUI 202 to apply the randomize animation behavior to a shape 204. For example, the motion graphic application can generate and apply a random offset to at least one of four control points 206a, 206b, 206c, 206d of the shape 204 based on user specified parameters. In doing so, rapid and varied effects can be caused to occur on the shape 204 by applying the randomize animation behavior. In some implementations, the random behavior can be adjusted based on parameters such as, an amount value, a multiplier value, an apply to option, a frequency value, a noisiness value, a link selection, and a preserve angle selection.

As shown in FIG. 2A, the GUI 202 includes a menu 208. A user can use controls on the menu 208 to adjust the randomization parameters to be applied to the shape 204. In the depicted examples, the menu 208 includes an amount sliding control 210, a multiplier sliding control 212, an apply to selection box 214, a frequency sliding control 216, a noisiness sliding control 218, a link check box 220, and a preserve angle check box 222.

Based on the value selected via the amount sliding control 210, the motion graphic application can add, subtract, or add and subtract a position of the control points 206a-d. For example, the motion graphic application can generate random offsets based on the selected amount. In one example, the application generates the random offsets using a uniform distribution with bounds being the selected amount and the negative of the selected amount.

Using the multiplier sliding control 212, the user may select a multiplier value. The multiplier sliding control 212 defines the maximum value that the randomize animation behavior will generate. The motion graphic application can generate a new position of the control points 206a-d based on the selected multiplier, for instance by multiplying the current position of the control points using a random multiplier generated using a uniform distribution with bounds being the selected multiplier and zero. The user can also disable the application to apply the amount or the multiplier parameter, or can select to apply only the amount parameter, only the multiplier parameter, or both parameters to the shape 204. For example, if the user selects to display the multiplier parameter, then the motion graphic application may not apply the generated multiplier to the positions of the control points 206a-d.

Using the apply to selection box 214, the user can select a target for applying the randomize animation behavior. The apply to selection box defines whether the randomize animation behavior is applied to the shape's control points, the tangent handles, or both points and handles.

In this regard, the selection box 214 may include a point option, a tangent option, and a point and tangent option. The random offsets may be applied to the control points 206a-d if the point option is selected. The random offsets may be applied to tangents of the control points 206a-d if the tangent option is selected or the control points 206a-d remain in a fixed position and the curves in between the control points 206a-d are animated. If the point and tangent option is selected, the motion graphic application applies the randomize animation behavior to both the control points 206a-d and the tangents of the control points 206a-d.

The frequency sliding control 216 allows the user to adjust an amount of random variation applied to the shape 204 per length of time. The user can select, in this example, to apply on average 10 random variations to the shape 204 per second. Higher values generate faster variations, whereas lower values generate slower variations The noisiness sliding control 218 is used to add an overlay of random variance to the frequency selected by the sliding control 216 or to other parameters. A high noisiness value may generate a more erratic variable to affected parameters.

By selecting the link check box 220, the motion graphic application proportionally applies the animation behavior effects to each of the dimension. For example, if the positions of the control points 206a-d are specified by a pair of coordinates (X, Y), the application would apply the randomize effect to the control points 206a-d proportionally in the X direction and Y direction.

The user can also select the preserve angle checkbox 222 to preserve the initial angle between tangents while applying the randomize animation behavior. For example, if the tangents are flat, the tangents can be varied in position and stay flat.

Referring to FIG. 2B, the user adjusts some of the randomize animation behavior parameters using the menu 208. The user reduces randomize parameters, such as the amount to 6.4, the multiplier to 42%, the frequency to 0.88, and the noisiness to 0.48. Also, the user selects to apply the randomize animation behavior to both points and tangents using the menu 210. As a result, the motion graphic application applies generated random offsets and multipliers to the both the control points 206a-d and the tangents of the control points 206a-d.

In FIG. 2C, the user further adjusts the randomize animation behavior using the menu 208. As shown, the user increases the frequency to 2.00 and the noisiness to 0.92. For example, the randomize animation behavior is applied to the shape 204 more frequently, resulting in a more rapid movement of the shape 204. Because the noisiness is increased, the motion graphic application overlays a higher random variance to the frequency value to create a less predictable animation.

Figure 3A:
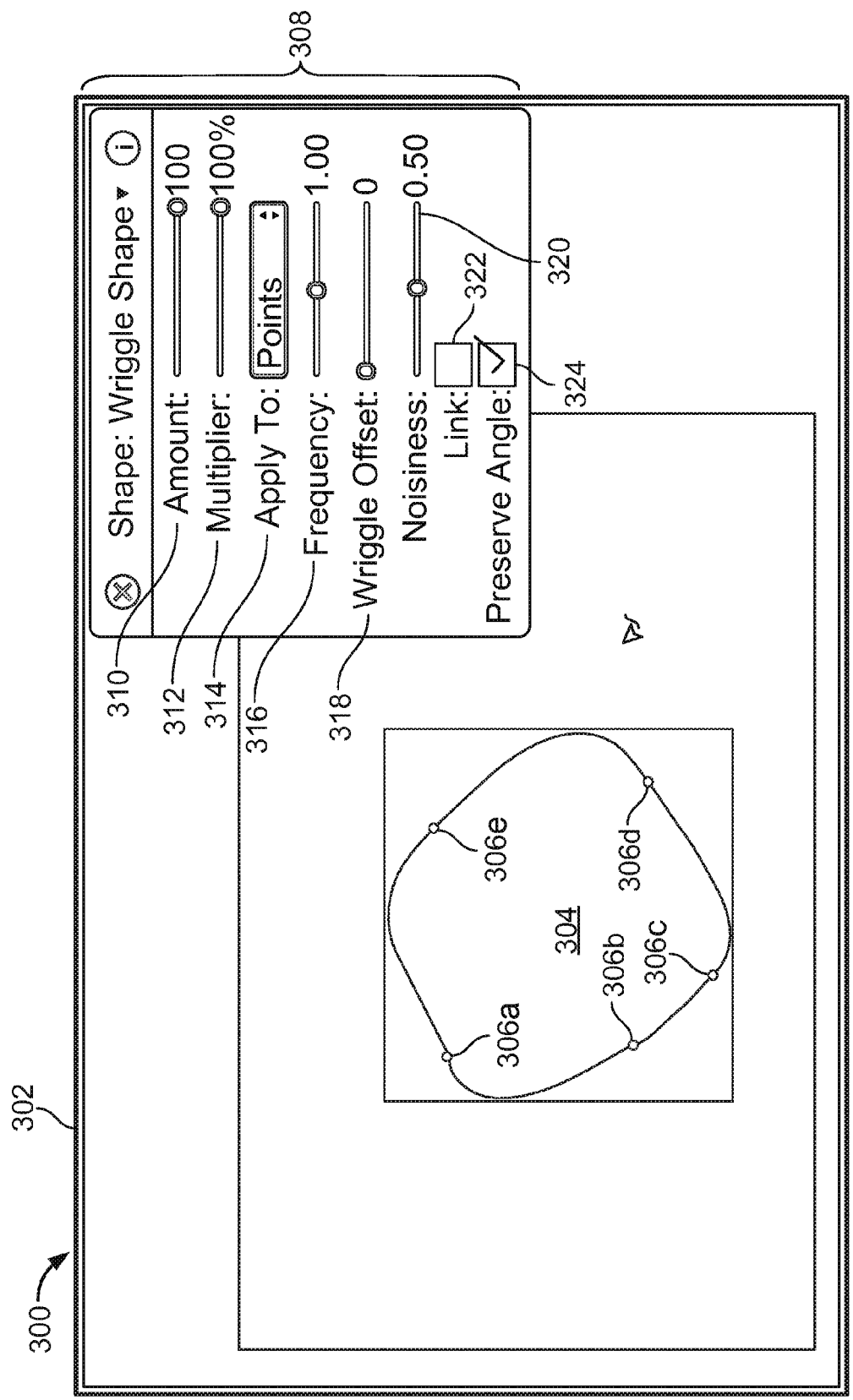
FIGS. 3A-3C depict an exemplary wriggle animation behavior.
Figure 3B:
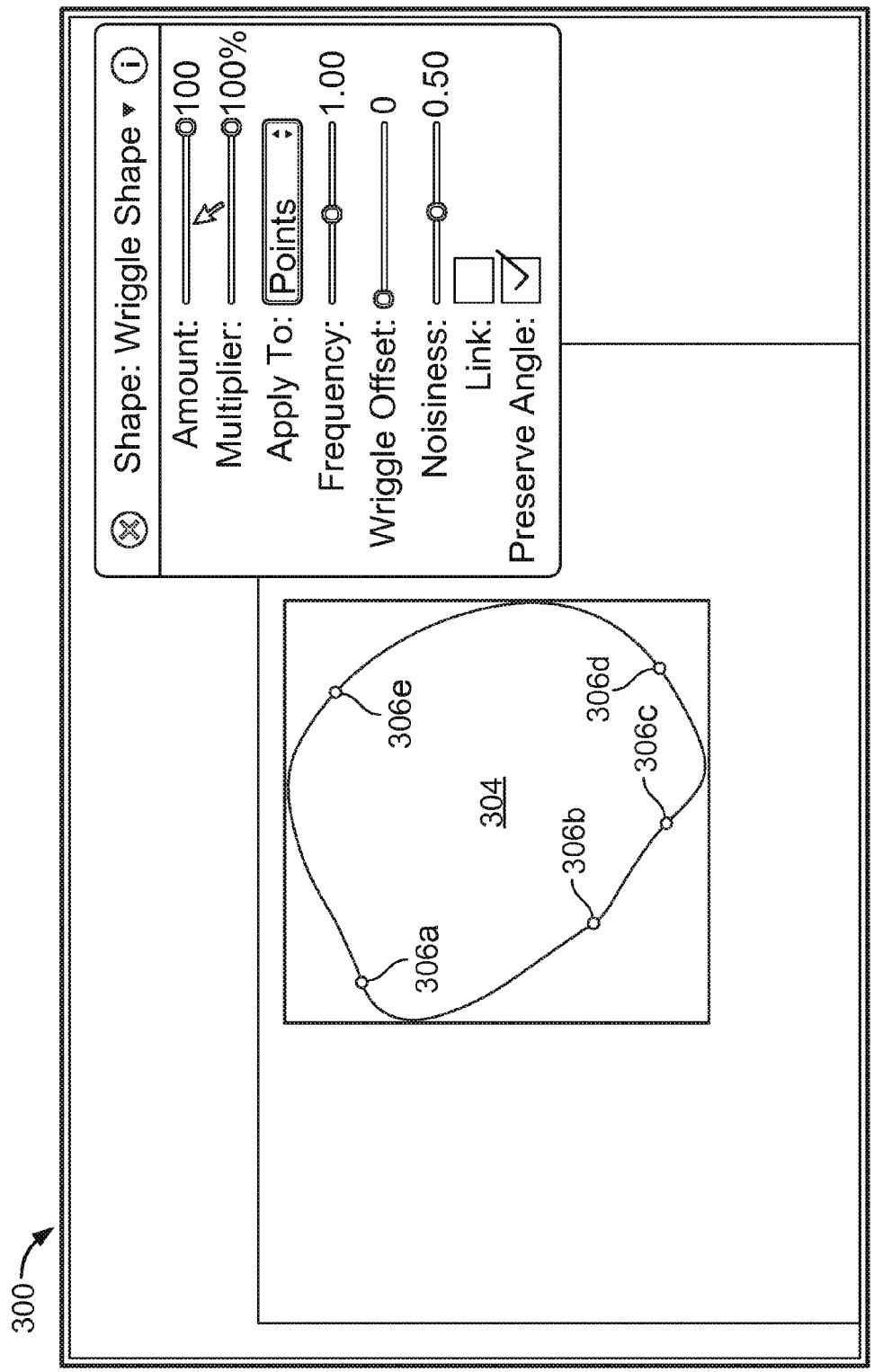
Figure 3C:
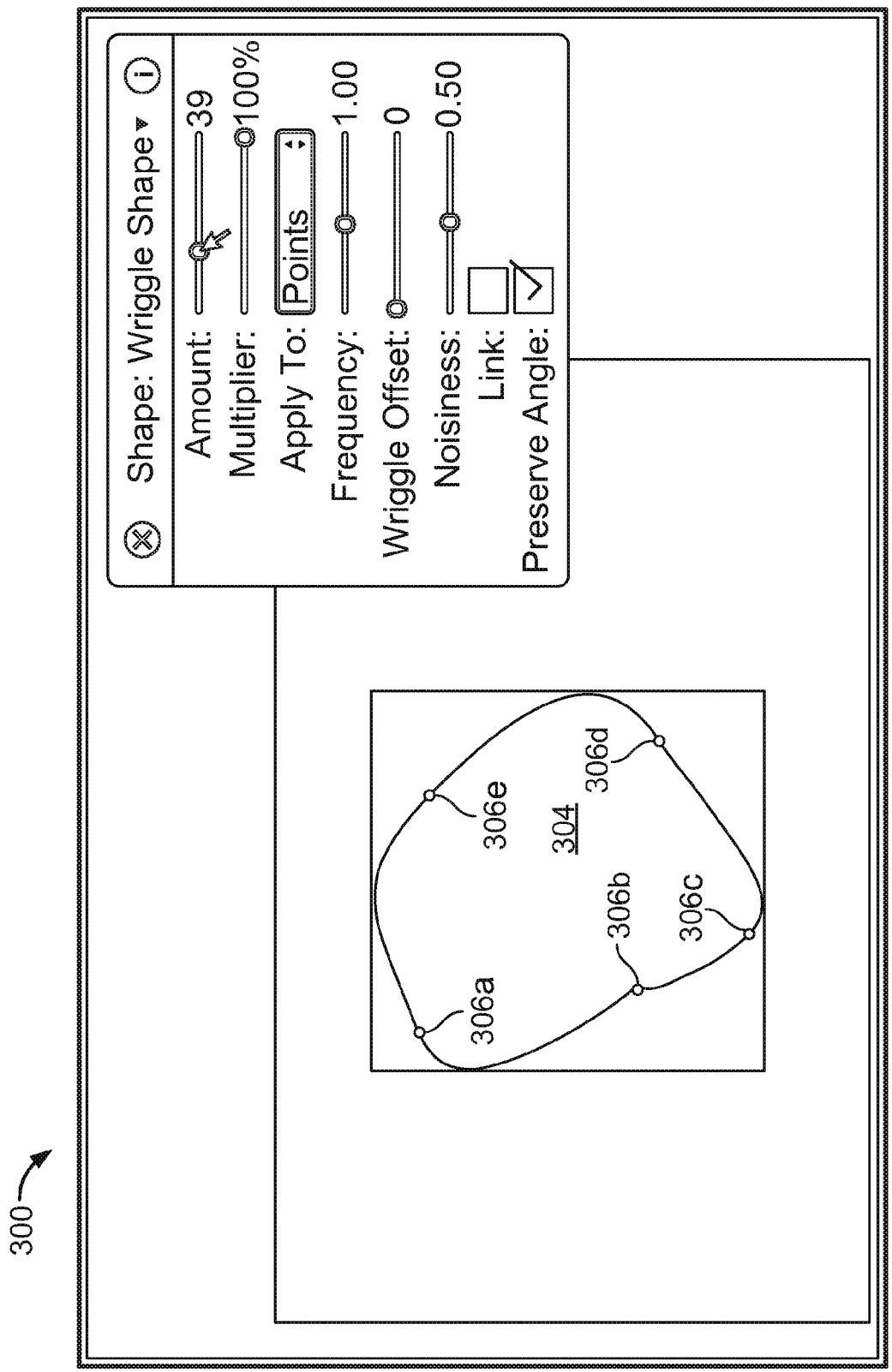

FIGS. 3A-3C illustrate an exemplary wriggle animation behavior in time-sequenced states 300, 330, 360. In general, the wriggle animation behavior has a similar effect as the randomize animation behavior, although the wriggle animation behavior allows for the used of with a greater range possible values, and provides the user with the option of adjusting a wriggle offset parameter.

Referring to FIG. 3A, the GUI 302 includes a shape 304 defined by five control points 306a, 306b, 306c, 306d, 306e, and a menu 308. A user uses the menu 308 to select one or more wriggle parameters to be applied to the shape 304. In FIG. 3A, the menu 308 includes an amount sliding control 310, a multiplier sliding control 312, an apply to selection box 314, a frequency sliding control 316, a wriggle offset sliding control 318, a noisiness sliding control 320, a link check box 322, and a preserve angle check box 324.

The user can adjust an amount of wriggle offset using the slide-control 310, adding the generated offset to a position of the control points 306a-e, or the wriggle offset may be have a value between the amount value and a negative of the amount value.

Similarly, the user can also select a multiplier value using the multiplier sliding control 312 or generate a random multiplier, where the multiplier value is used to multiply the positions of the control points 306a-e. The user can set a maximum multiplier by selecting a value using the sliding control 312. Alternatively, the user can select an apply mode for the amount parameter and the multiplier parameter to apply the amount parameter, the multiplier parameter, or both parameters to the shape 304.

Using the apply to selection box 314, the user can select an apply to target from a few options. The options may be a point option, a tangent option, or a point and tangent option. The motion graphic application can apply the wriggle animation behavior to the control points 306a-e if the point option is selected, or the motion graphic application can apply the wriggle offset to the tangents of the control points 306a-e if the tangent option is selected. If the point and tangent option is selected, the motion graphic application can apply the wriggle offset and the wriggle multiplier to the control points 306a-e and the tangents of the control points 306a-e, respectively.

The frequency sliding control 316 allows the user to adjust the amount of random variation applied to the shape 304 per length of time. The user can select to apply on average 1.00 random variation to the shape 304 per second.

The user can use the wriggle offset sliding control 318 to offset the sequence of generated random values. In some examples, a wriggle animation behavior defined by the same set of wriggle parameters can be applied to multiple objects. By setting a different wriggle offset to the multiple objects, the user can prevent the shapes from moving in synchronization.

The user can also use the noisiness sliding control 320 to add an overlay of random variance to the frequency selected by the sliding control 316. In some examples, a high noisiness may generate a more erratic variable in the affected parameters.

By selecting the link check box 322, the motion graphic application can apply the behavior effects to each of the dimension proportionally. The positions of the control points 306a-e may be specified by a pair of coordinates (X, Y). If the check box 322 is checked, the application can apply the wriggle effect to the shape 304 proportionally in the X direction and Y direction. The user can select a three dimensional (3D) shape that includes control points' positions to be specified by a set of coordinates (X, Y, Z). If the check box 322 is checked, the motion graphic application can apply the wriggle effect to the three coordinates (X, Y, Z) of each of the control points proportionally.

The user can also select the preserve angle checkbox 324 to preserve the initial angle between tangents while applying the randomize animation behavior. If the tangents are flat, the tangents can be varied in position and stay flat.

The motion graphic application can apply the wriggle animation behavior based on parameters specified by the user in the menu 308. After receiving a set of user-specified parameters as shown in FIG. 3A, the application can generate a maximum wriggle offset of 100 units and a maximum multiplier of 100%. The application may apply the wriggle animation behavior to the control points 306a-e with a frequency of one variation per second and a random variance of the frequency of 0.5. The applied wriggle animation behavior has a wriggle offset of zero in this case. Additionally, the angles between tangents are preserved.

FIG. 3B shows an example of the shape 304 after applying the wriggle animation behavior specified in the state 300 (FIG. 3A). As shown, the positions of the control points 306a-e are wriggled by one or more generated wriggle offset that are generated based on the user-specified parameters.

FIG. 3C shows another example of the shape 304 of applying a wriggle animation behavior having different wriggle parameter. The user adjustment to apply a smaller wriggle offset is applied to the control points 306a-e. As a result, the control points 306a-e may be moved with a relatively smaller displacement, relative to the wriggle animation behavior shown in FIGS. 3A and 3B.

Figure 4A:
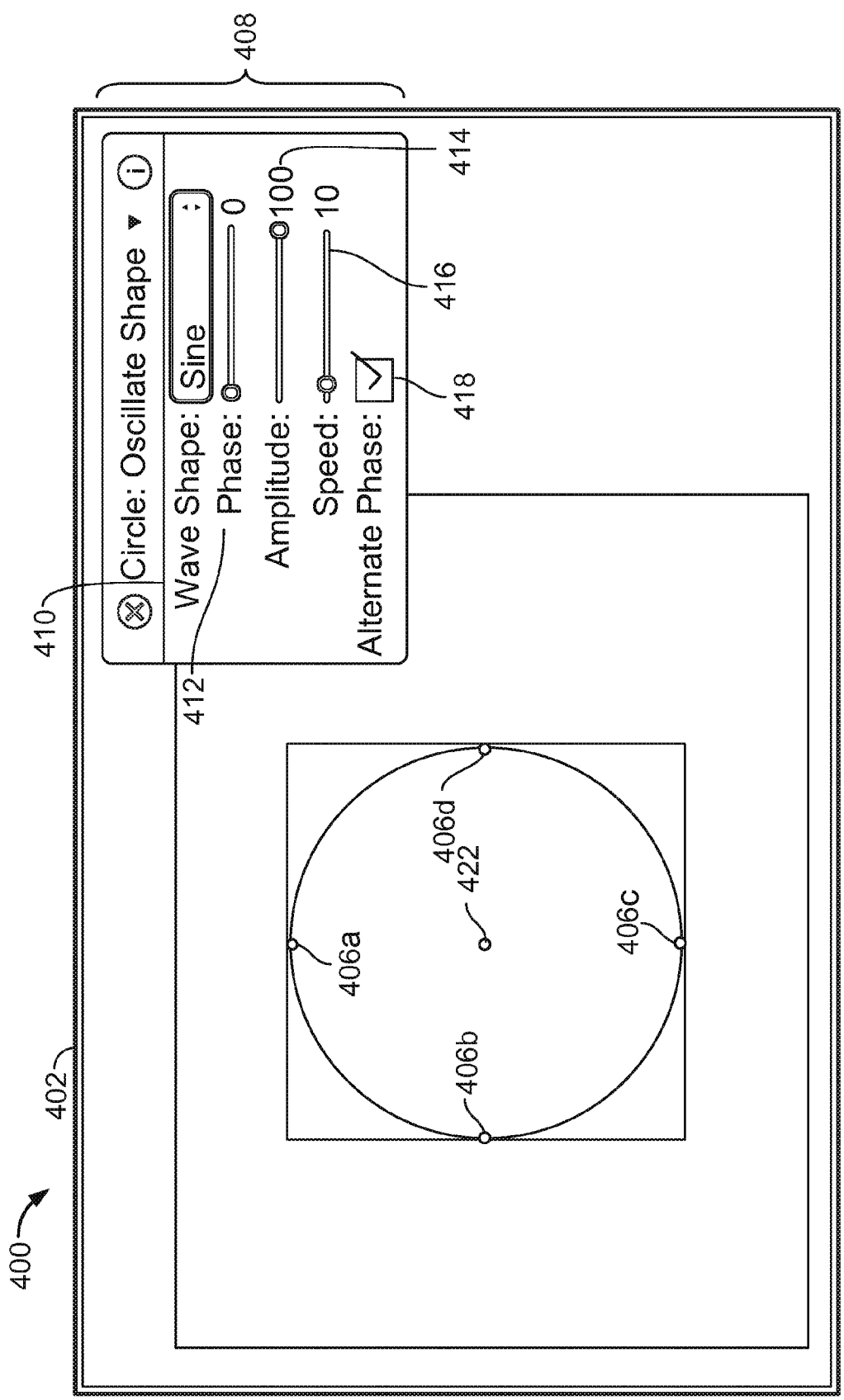

FIGS. 4A-4I illustrate an exemplary oscillation behavior, in time-sequenced states 400, 420, 430, 440, 450, 460, 470, 480, 490. As shown in FIG. 4A, the GUI 402 displays a shape 404 having four control points 406a, 406b, 406c, 406d. In some implementations, the oscillate behavior oscillates the position of each of the control points 406a-d on a line originating from a point or a line perpendicular to the initial control point position.

In one example implementation, the application generates the oscillation animation behavior based on some oscillation parameters, such as a wave shape, a phase, an amplitude, a speed, and/or an alternate phase of the oscillation. As shown in FIG. 4A, the GUI 402 includes a menu 408 for adjusting the oscillation parameters. The user may use a wave shape selection box 410 to select a shape of the oscillation wave (e.g., a sine wave, a saw tooth wave, or a triangular wave).

The menu 408 includes sliding controls 412, 414, 416 to adjust the phase, the amplitude, and the speed parameters, respectively. Using the phase sliding control 412, the user adjusts a point of the specified oscillation at which the behavior starts, or can adjust phases of multiple shapes so that the shapes oscillate out of phase. The user can also use the amplitude sliding control to adjust a maximum value that the control points 406a-d can oscillate between. The application can swing the control points 406a-d between the amplitude value and the negative of the amplitude value. The speed sliding control 416 allows the user to adjust the speed at which the oscillation occurs (e.g., in terms of oscillation per unit of time).

Figure 4B:
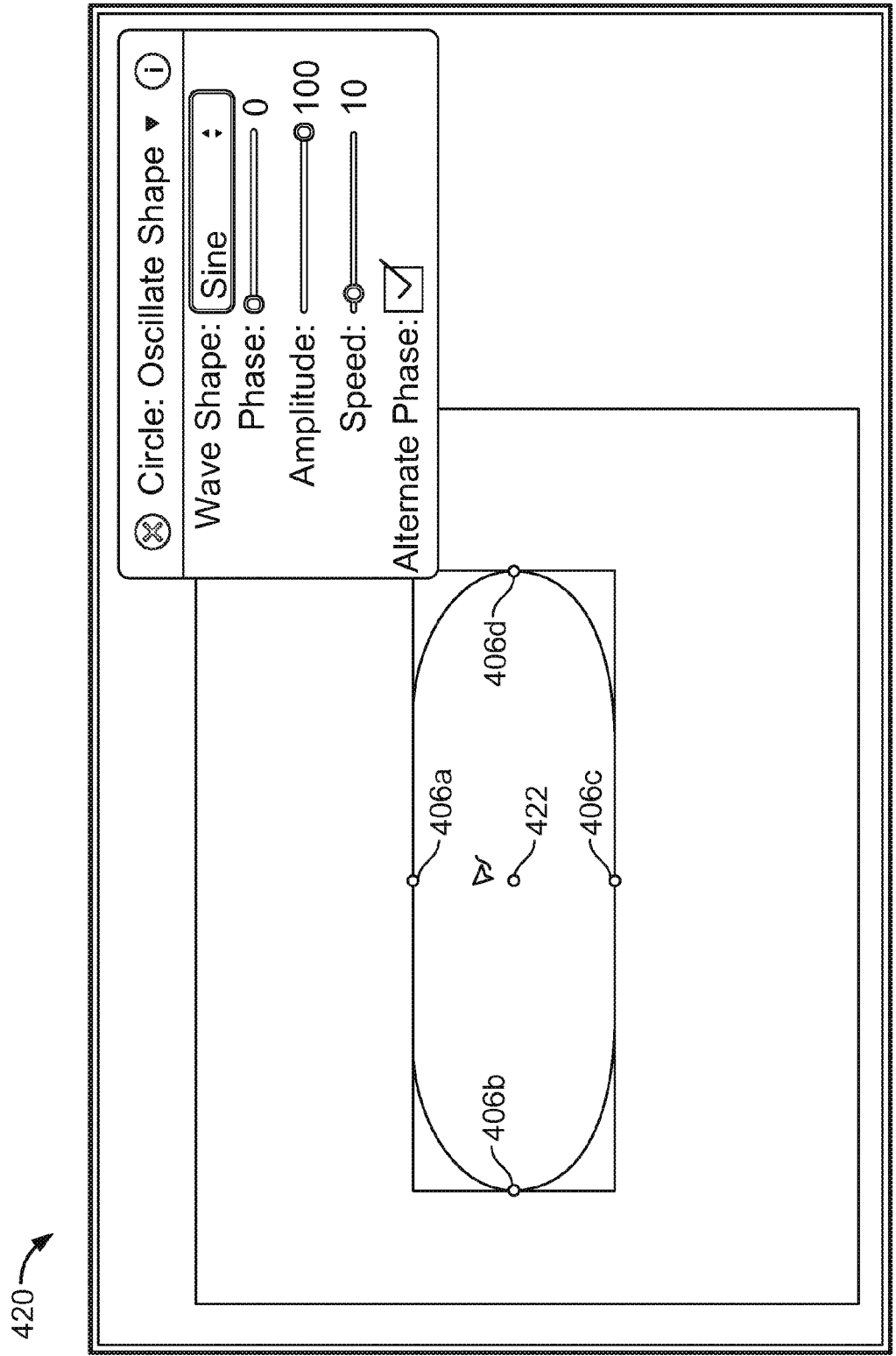
Figure 4C:
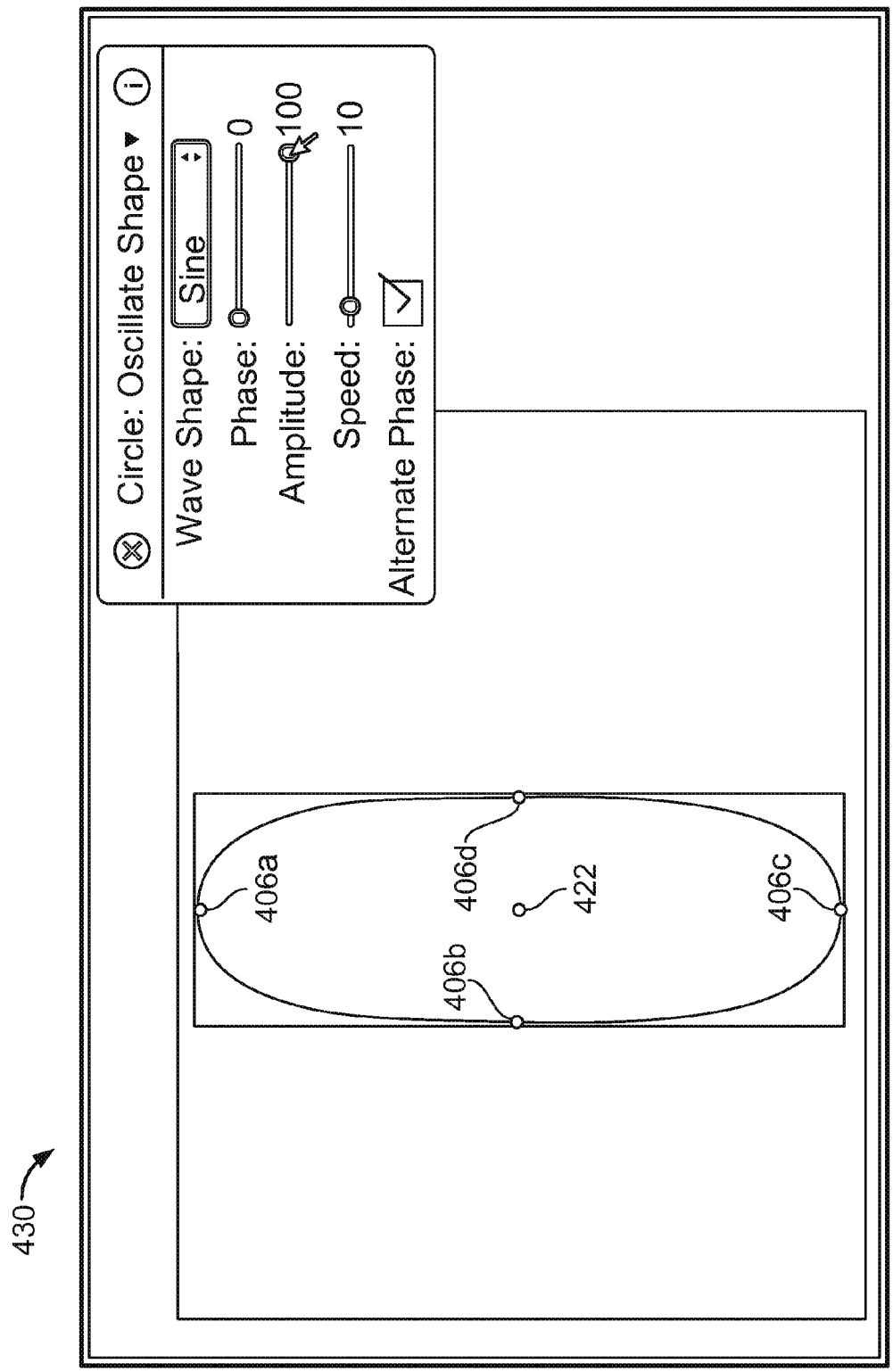

The menu 408 also includes an alternate phase selection box 418. If the alternate phase selection box 418 is selected, the motion graphic application oscillates the control points 406a-d 180 degrees out-of-phase to adjacent control points. As an illustrative example, the states 400, 420, 430 (FIGS. 4A-4C) are shown sequentially to show an effect of the oscillation animation behavior. After applying the oscillation parameters specified in the state 400 (FIG. 4A), the control points 406a, 406c are moved towards a point 422 as shown in the state 420 (FIG. 4B). Also, the control points 406b, 406d are moved away from the point 422. After some time, the control points 406a-d continues to oscillate to positions as shown in the state 430 (FIG. 4C).

Figure 4D:
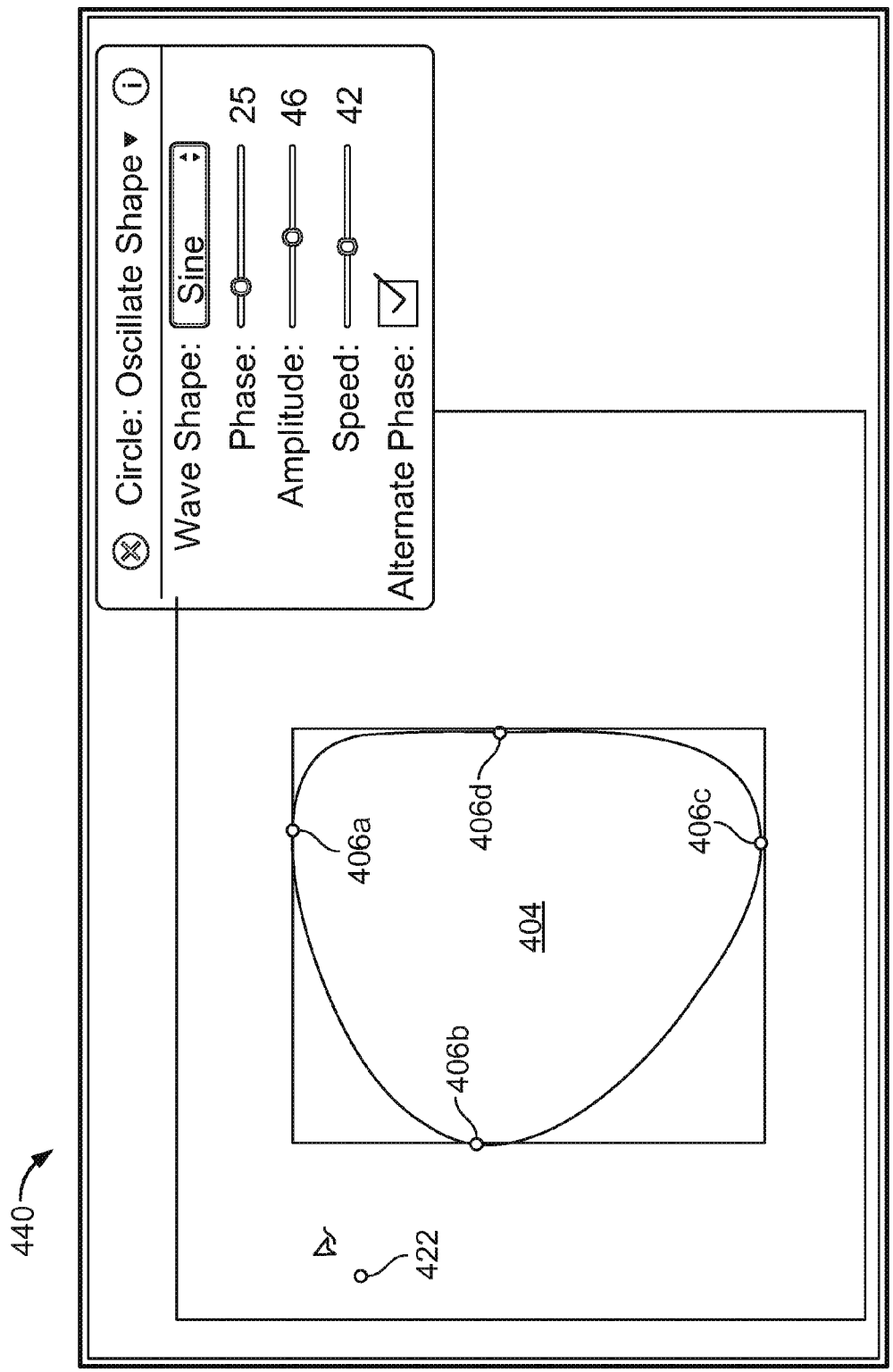

The point 422 may be moved to change oscillation direction of the control points 406a-d. FIG. 4D shows an example effect of displacing the point 422. As shown the state 440, the point 422 is moved to a new position. The control points 406a-d adjust to oscillate around the new position of the point 422, resulting in the graphic shown in FIG. 4D.

In certain implementations, the graphic motion application can also allow the user to select an oscillation direction of the control points 406a-d. The user can select the control points 406a-d to oscillate centered at a point or perpendicular to a line, where the control points 406a-d oscillate centered at the point 422. The states 450, 460, 470 show examples of selecting the control points 406a-d to oscillate perpendicular to a line.

Figure 4E:
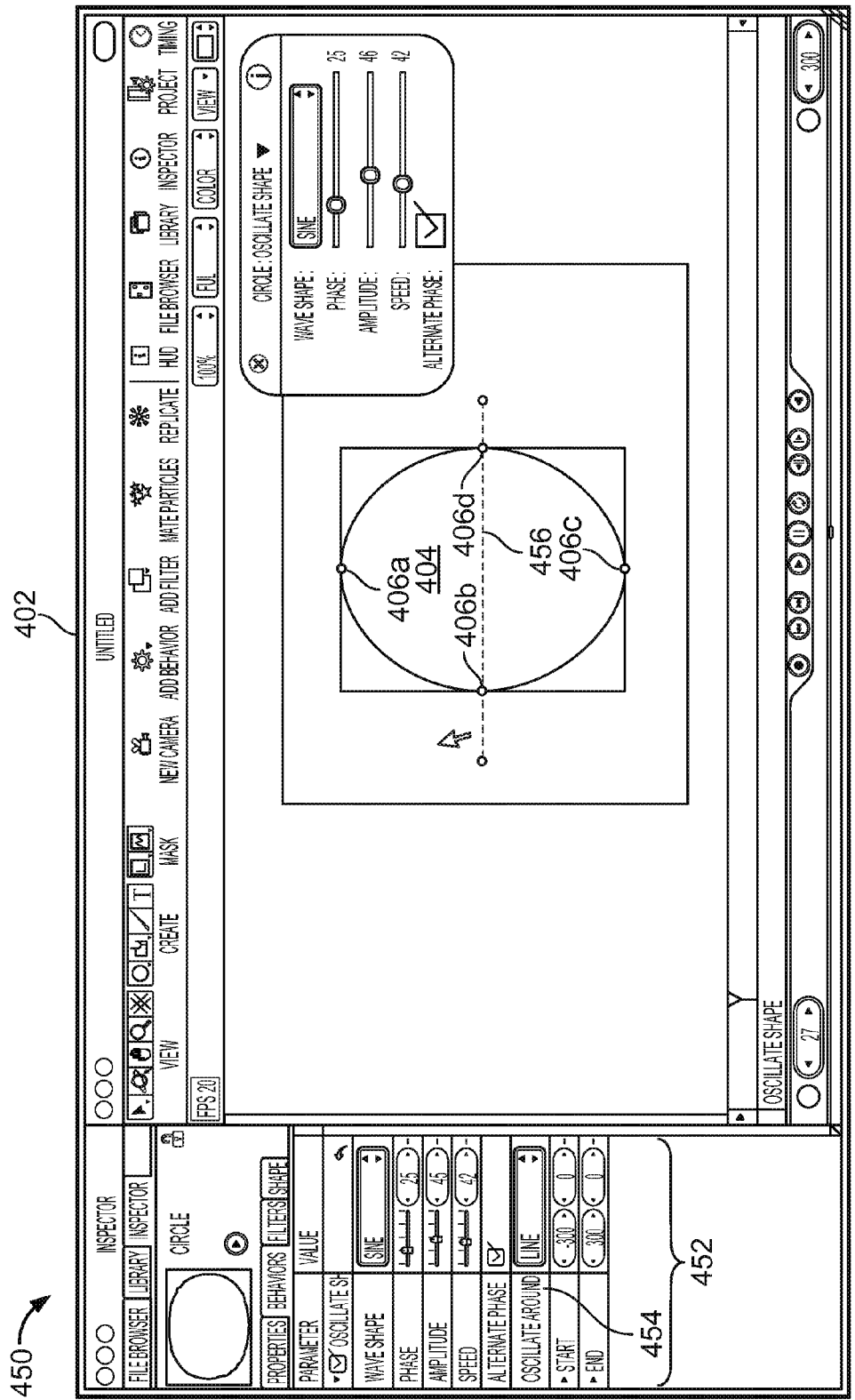

Referring to FIG. 4E, the GUI 402 further includes a behavior menu 452. The behavior menu 452 includes an oscillate around selection box 454. If the user selects a line option from the selection box 454, the GUI 402 allows the user to place a line 456 on the motion graphic. In some implementations, the motion graphic application apply oscillating motion to the control points 406a-d perpendicular to the line 456.

Figure 4F:
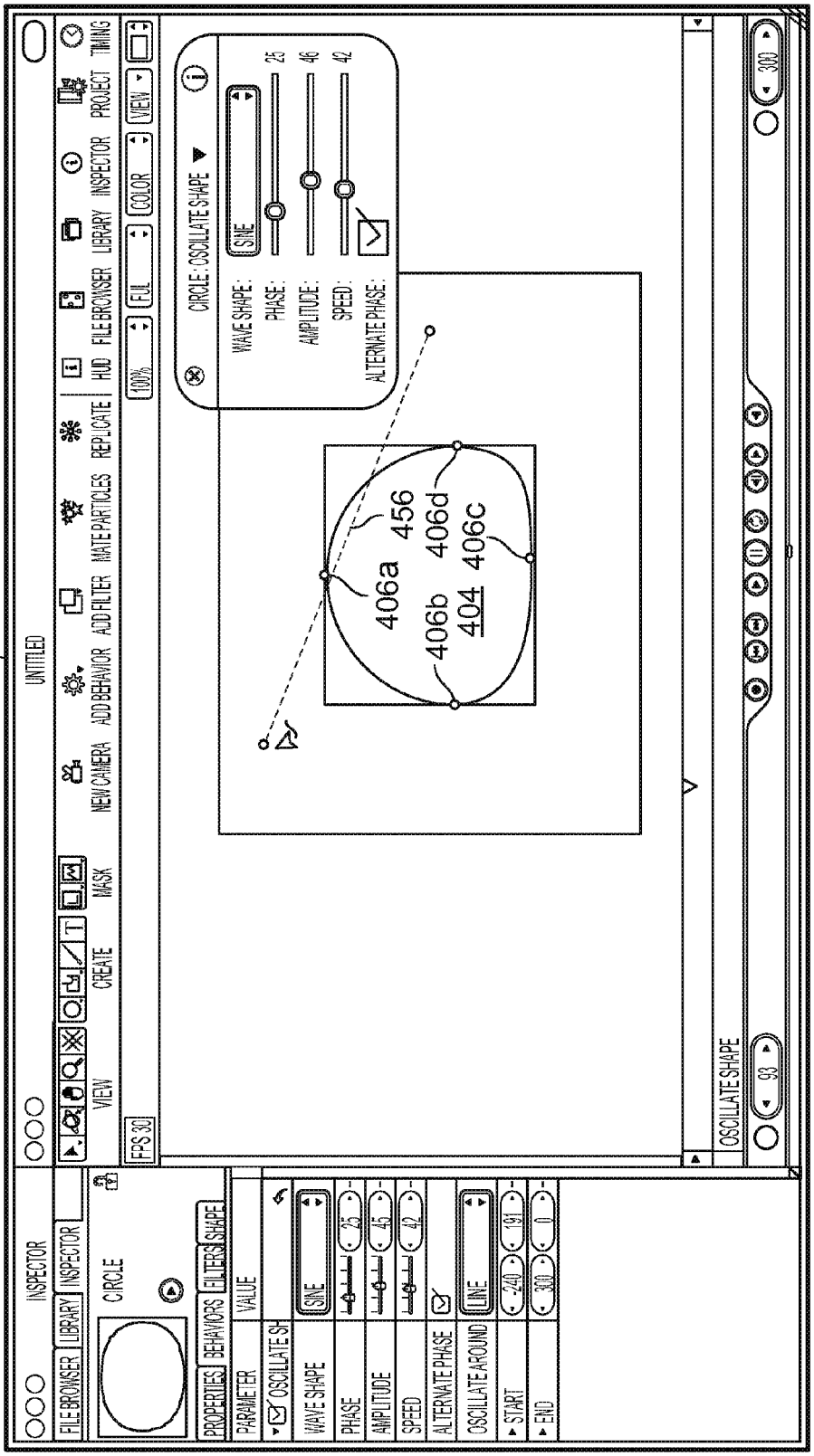
Figure 4G:
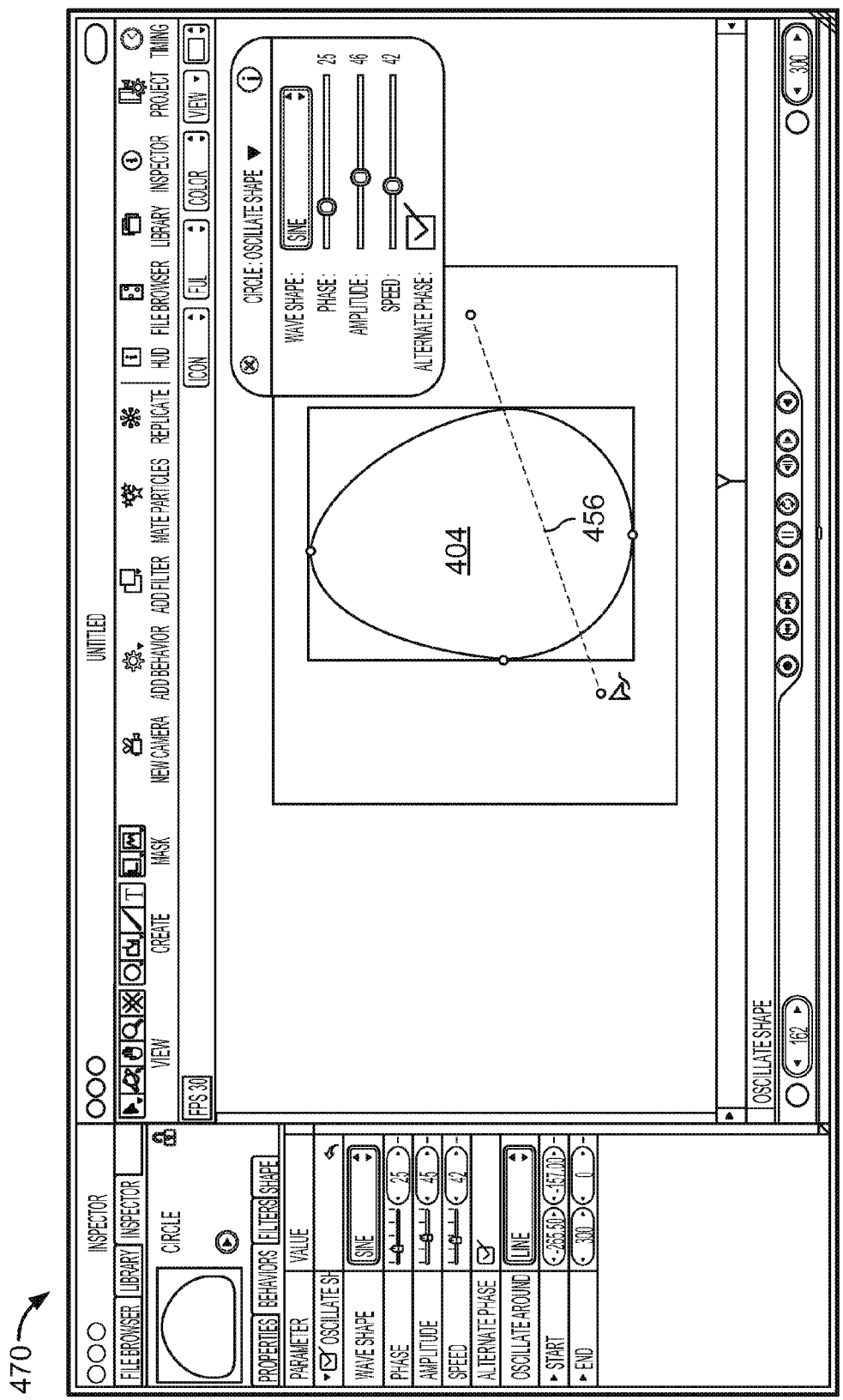

Referring to FIG. 4F, the user can move the line 456 to adjust oscillation directions of the control points 406a-d. As shown, the control points 406a-d oscillate perpendicular to the line 456, resulting in an animated graphic of the shape 404 displayed in the GUI 402. Referring to FIG. 4G, the line 456 is further moved to another position, resulting in a different animated image of the shape 404.

Figure 4H:
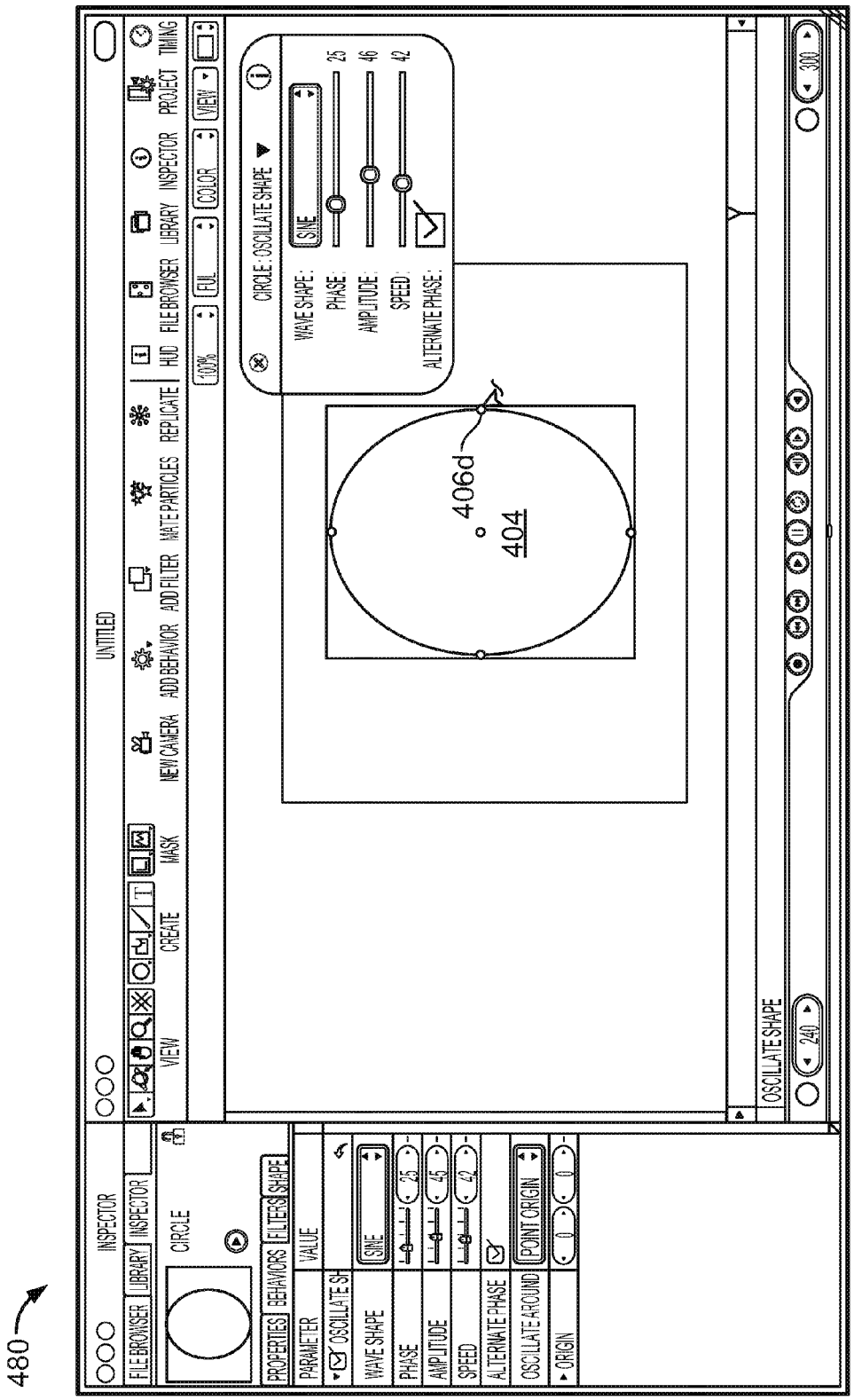
Figure 41:
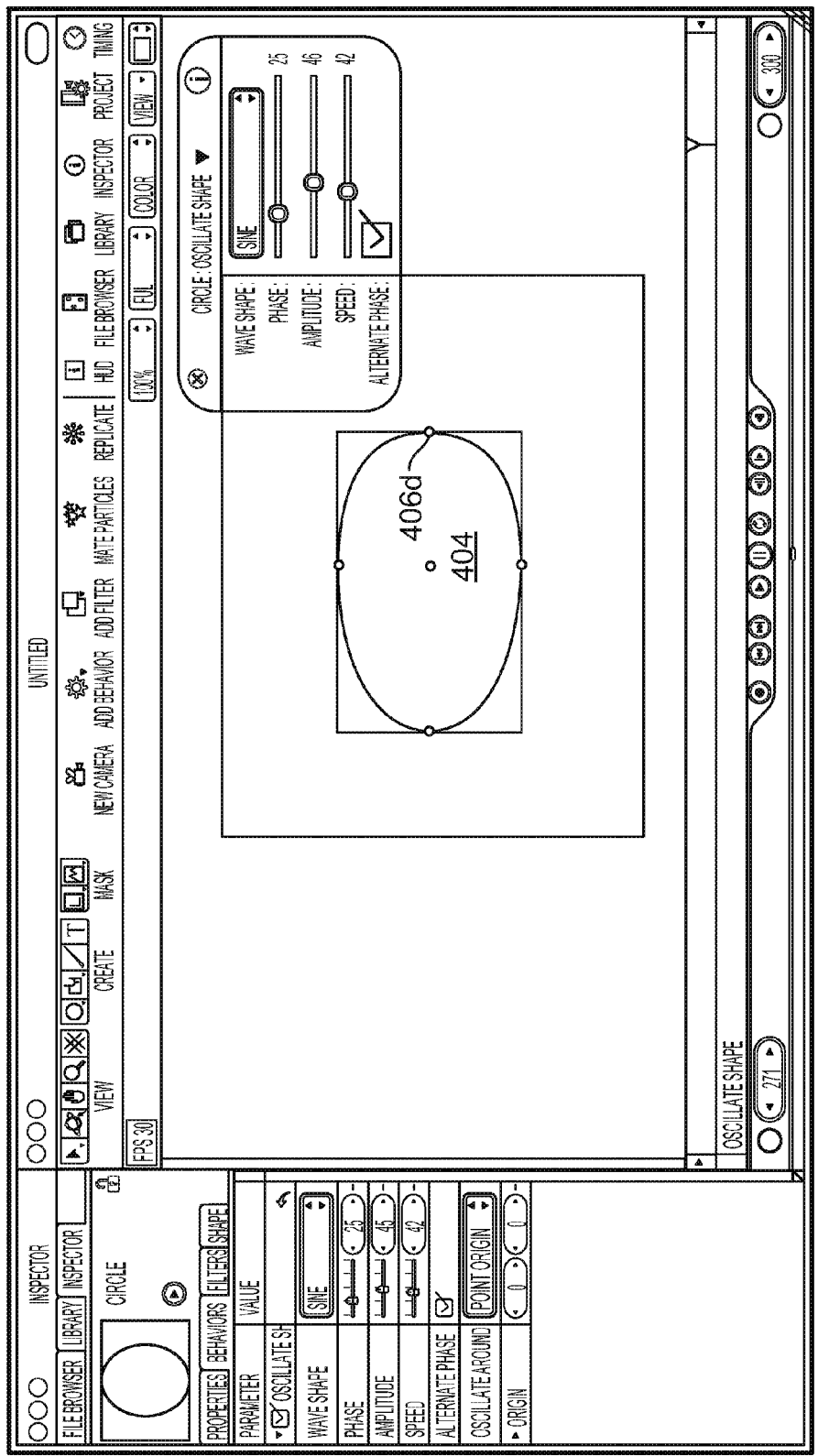

The GUI 402 can also allow a user to disable to apply oscillate behavior to one or more of the control points 406a-d. As shown in FIG. 4H, the user select to disable the control point 406d. As a result, the shape 404 oscillates from the point 422 without oscillating the point 406d as shown in FIG. 4I.

The user can also disable one or more of the control points in applying the randomize animation behavior and the wriggle animation behavior. For example, the user can disable one of the control points 202a-d so that no randomize animation behavior is applied to the disabled control point. The motion graphic application can include other behavior to be applied to a user selected shape. In one example, the motion graphic application can include behavior such as a bouncing behavior. A set of parameters may be defined for the bouncing behavior. Based on the user specified parameters, the user can animate the selected shape by applying the bouncing behavior.

Figure 5:
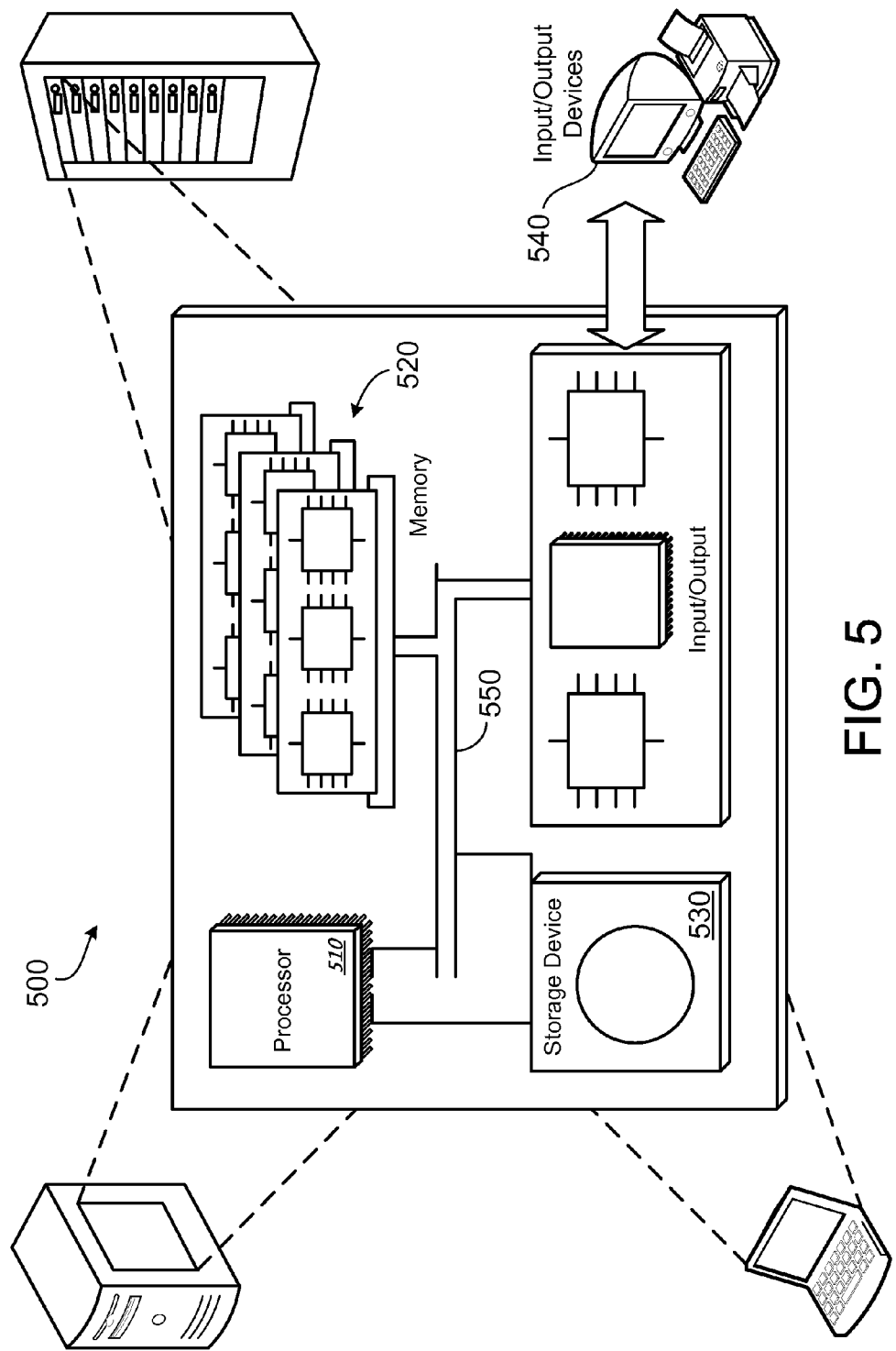
FIG. 5 is a block diagram of a computing system implementing the enhanced motion behavior framework.

FIG. 5 is a diagram of an exemplary computer system 500 that implements the enhanced motion behavior framework. According to one general implementation, the system 500 is used for the operations described in association with the process 100. For example, the system 500 may be used to apply and display shape behavior to user specified objects.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, application, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for presenting a user with test case information may be used. In addition, the logic flows depicted in the figures do not require the particular order shown, or sequential order, to achieve desirable results. Other functions may be provided or eliminated, from the described flows, and other components may be added to, or removed from, the described systems. Accordingly, other implementations are within the scope of the following claims.

What is claimed is:

1. A computer-implemented method comprising:
receiving, by data processing apparatus, a selection of an object to be animated, the object having an object shape defined by a quantity of connected control points that are included in and are fewer than a plurality of points on the object shape;
receiving, by the data processing apparatus, a selection of one or more animation parameters to be applied to the quantity of connected control points, wherein an animation parameter continuously affects positions of each of the quantity of control points in a plurality of successive frames over time with no end state;
in response to receiving the selection of the object and the selection of the one or more animation parameters:
applying, by the data processing apparatus, the one or more selected animation parameters to the quantity of control points in the frame,
determining, by the data processing apparatus, a new position for each of the quantity of connected control points in each successive frame based on the application of the one or more animation parameters to the one or more of the quantity of connected control points in the frame, and
continuously re-drawing the object shape based on the new position of each of the quantity of connected control points in each successive frame;
receiving, by the data processing apparatus, input to disable the one or more selected animation parameters applied to a particular control point of the quantity of control points, the input comprising a selection of the particular control point;
in response to receiving the input to disable the one or more selected animation parameters, continuously re-drawing the object shape based on the new position of each of the remaining quantity of connected control points except the particular control point in each successive frame.

2. The computer-implemented method of claim 1, wherein one or more of the animation parameters define a randomization animation behavior.

3. The computer-implemented method of claim 2, wherein the one or more animation parameters include an amount parameter, a multiplier parameter, an apply to parameter, a frequency parameter, a noisiness parameter, or a preserve angle parameter.

4. The computer-implemented method of claim 1, wherein one or more of the animation parameters defines a wriggle animation behavior.

5. The computer-implemented method of claim 4, wherein the one or more animation parameters include an amount parameter, a multiplier parameter, an apply to parameter, a frequency parameter, a wriggle offset parameter, a noisiness parameter, a link parameter, or a preserve angle parameter.

6. The computer-implemented method of claim 1, wherein one or more of the animation parameters defines an oscillation animation behavior.

7. The computer-implemented method of claim 6, wherein the one or more animation parameters includes a wave shape parameter, a phase parameter, an amplitude parameter, a speed parameter, or an alternate phase parameter.

8. The computer-implemented method of claim 1, wherein applying the one or more animation parameters further comprises constraining movement of the object using a pinning point.

9. The computer-implemented method of claim 1, wherein applying the one or more animation parameters further comprises moving the object around a center point.

10. The computer-implemented method of claim 1, wherein the one or more animation parameters are applied about a moving axis.

11. The computer-implemented method of claim 1, further comprising displaying the animation of the object in real-time or near-real time relative to receiving the selection of the object and the selection of the one or more animation parameters.

12. The computer-implemented method of claim 1, wherein one or more of the animation parameters animates the one or more of the quantity of control points by cycling the control points between two different values.

13. The computer-implemented method of claim 12, wherein cycling the control points between the two different values creates a sine wave shape between the control points.

14. The computer-implemented method of claim 12, wherein cycling the control points between the two different values creates a square wave shape between the control points.

15. The computer-implemented method of claim 12, wherein cycling the control points between the two different values creates a sawtooth wave shape between the control points.

16. The computer-implemented method of claim 12, wherein cycling the control points between the two different values creates a triangle wave shape between the control points.

17. The computer-implemented method of claim 12, wherein one or more of the animation parameters adjusts a phase of the cycling of the control points.

18. The computer-implemented method of claim 12, wherein one or more of the animation parameters adjusts an amplitude of the cycling of the control points.

19. The computer-implemented method of claim 12, wherein one or more of the animation parameters adjusts a speed of the cycling of the control points.

20. The computer-implemented method of claim 12, wherein one or more of the animation parameters offsets a phase of a first control point from a phase of an adjacent second control point by 180°.

21. The computer-implemented method of claim 12, wherein one or more of the animation parameters adjusts the cycling of a first control point to be aligned based on a point.

22. The computer-implemented method of claim 12, wherein one or more of the animation parameters adjusts the cycling of a first control point to be aligned perpendicular to a line.

23. The computer-implemented method of claim 1, wherein one or more of the animation parameters animates the one or more of the quantity of control points by applying a random offset to the control points.

24. The computer-implemented method of claim 23, wherein one or more of the animation parameters defines a maximum value to offset the control points.

25. The computer-implemented method of claim 24, wherein the offset is an additive offset, a substractive offset, or an additive and substractive offset.

26. The computer-implemented method of claim 24, wherein one or more of the animation parameters defines an amount of random variation per unit time.

27. The computer-implemented method of claim 26, wherein one or more of the animation parameters defines additional random variance to the defined amount of random variation per unit time.

28. The computer-implemented method of claim 23, wherein one or more of the animation parameters defines a proportionality of the random offset.

29. The computer-implemented method of claim 1, wherein the object is further defined by tangent handles, and wherein one or more of the animation parameters animates the quantity of control point by applying a random offset to the tangent handles.

30. The computer-implemented method of claim 29, wherein one or more of the animation parameters defines the flatness of the tangent angles.

31. A computer program product tangibly embodied in a non-transitory machine readable medium, the computer program product comprising instructions that, when read by a machine, operate to cause a data processing apparatus to:
receive a selection of an object to be animated, the object having an object shape defined by a quantity of connected control points that are included in and are fewer than a plurality of points on the object shape;
receive a selection of one or more animation parameters to be applied to the quantity of control points, wherein an animation parameter continuously affects positions of each of the quantity of control points in a plurality of successive frames over time with no end state;
in response to receiving the selection of the object and the selection of the one or more animation parameters:
apply the one or more animation parameters to the quantity of control points in the frame,
determine a new position of each of the quantity of control points in each successive frame based on the application of the one or more animation parameters to the one or more of the quantity of connected control points in the frame, and
continuously re-draw the object shape based on the new position of each of the quantity of control points in each successive frame;
receive input to disable the one or more selected animation parameters applied to a particular control point of the quantity of control points, the input comprising a selection of the particular control point;
in response to receiving the input to disable the one or more selected animation parameters, continuously re-drawing the object shape based on the new position of each of the remaining quantity of connected control points except the particular control point in each successive frame.

32. A system comprising:
data processing apparatus; and
a computer-readable medium tangibly encoding computer software instructions executable by the data processing apparatus to perform operations comprising:
receiving a selection of an object to be animated, the object having an object shape defined by a quantity of connected control points that are included in and are fewer than a plurality of points on the object shape;
receiving a selection of one or more animation parameters to be applied to the quantity of control points, wherein an animation parameter continuously affects positions of each of the quantity of at least two control points in a plurality of successive frames over time with no end state;
in response to receiving the selection of the object and the selection of the one or more animation parameters:
applying the one or more animation parameters to the quantity of control points in the frame,
determining a new position of each of the quantity of control points in each successive based on the application of the one or more animation parameters to each of the quantity of connected control points in the frame, and continuously re-drawing the object shape based on the new position of each of the quantity of connected control points in each successive frame;

receiving input to disable the one or more selected animation parameters applied to a particular control point of the quantity of control points, the input comprising a selection of the particular control point;

in response to receiving the input to disable the one or more selected animation parameters, disabling the one or more selected animation parameters applied to the particular control point, continuously re-drawing the object shape based on the new position of each of the remaining quantity of connected control points except the particular control point in each successive frame.

33. The system of claim 32, wherein the object is a vector-based object, and wherein the quantity of control points determine mathematical curves of the object.

34. The computer-implemented method of claim 1, wherein the object is a vector-based object, and wherein the quantity of control points determine mathematical curves of the object.

35. The computer program product of claim 31, wherein the object is a vector-based object, and wherein the quantity of control points determine mathematical curves of the object.

* * * * *